W. ADAMS.
PLANT CHOPPING MACHINE.
APPLICATION FILED OCT. 12, 1920.
1,389,570.
Patented Sept. 6, 1921.
2 SHEETS—SHEET 1.
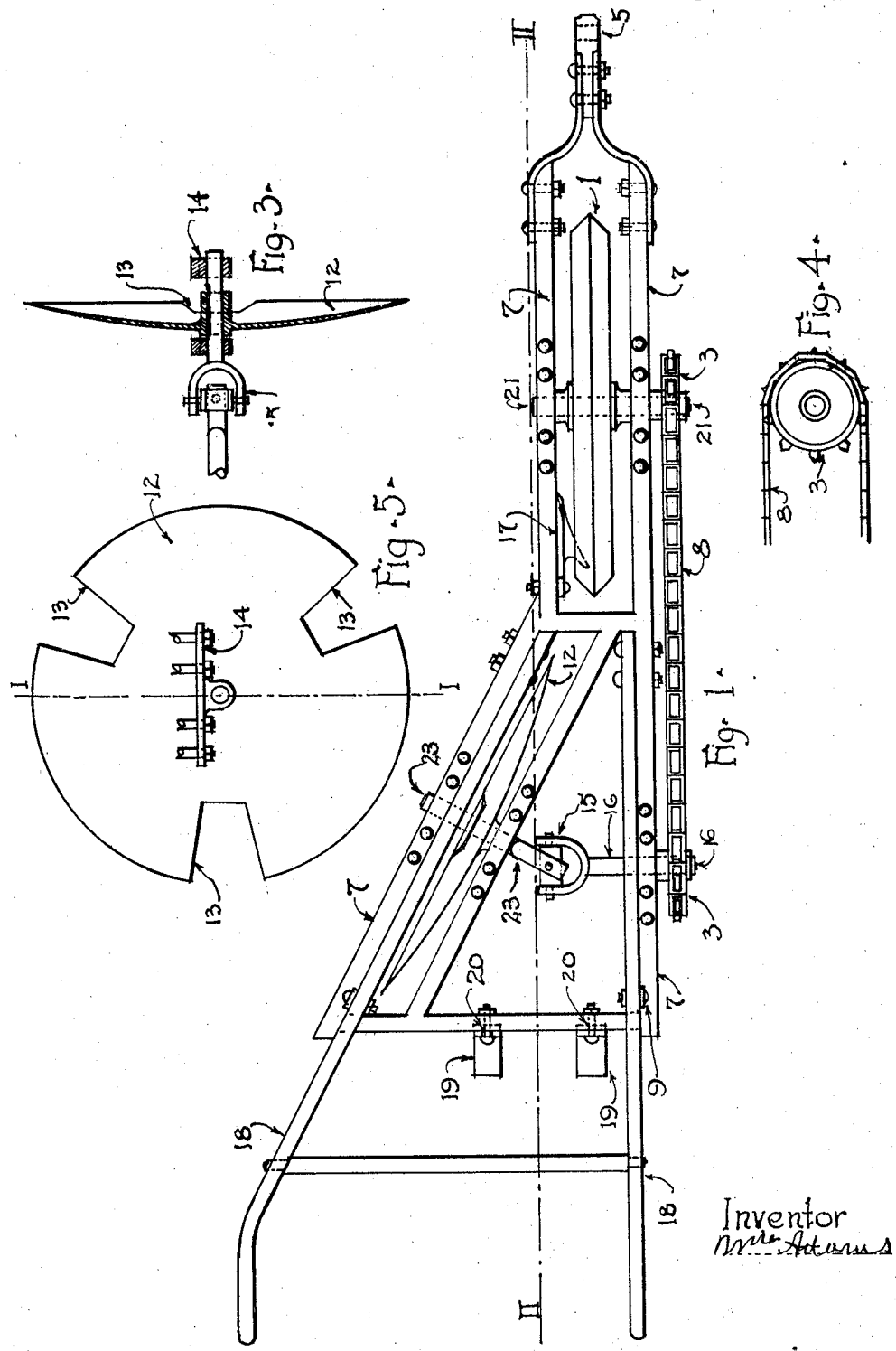
Inventor
Wm. Adams

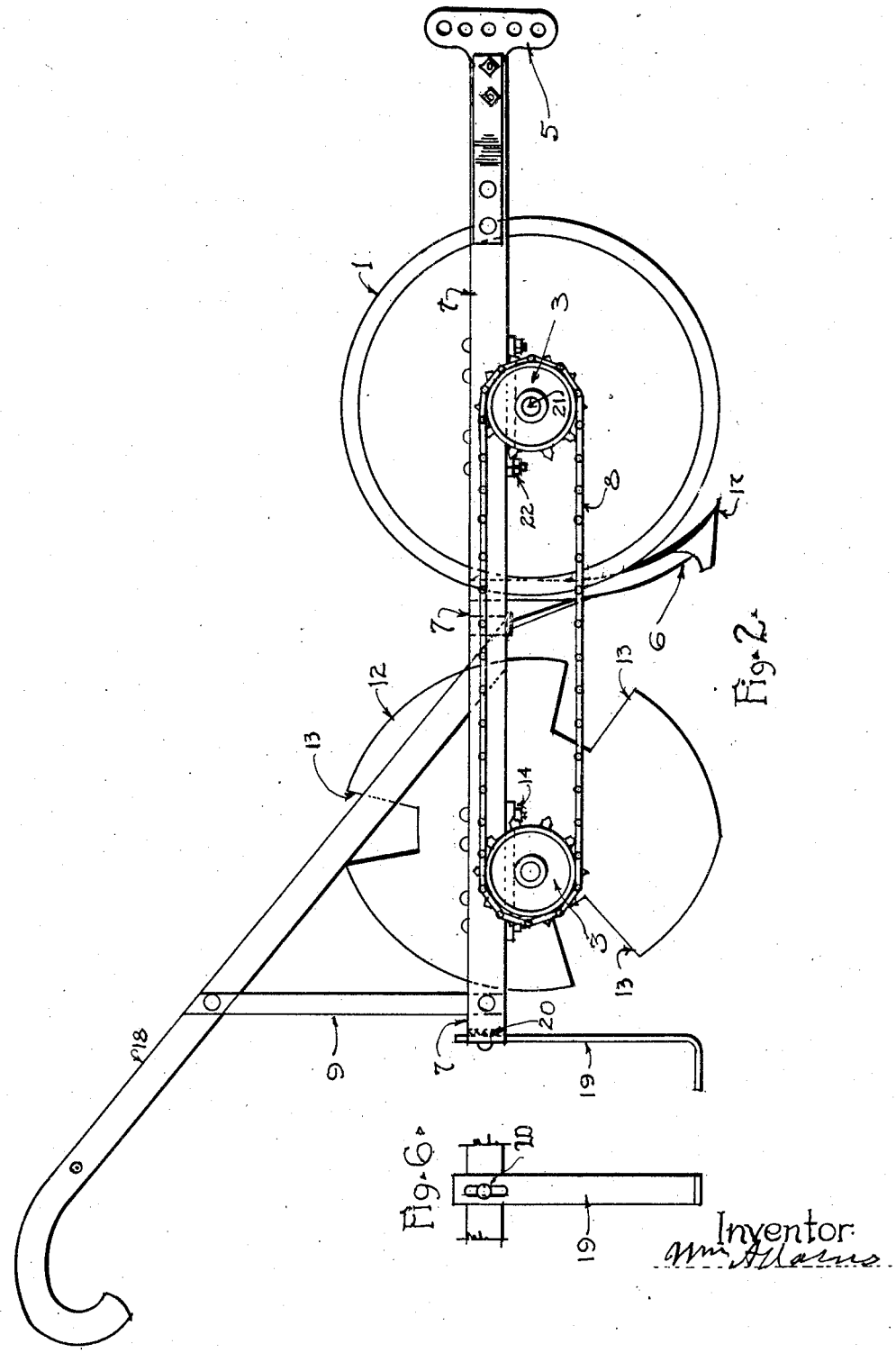

UNITED STATES PATENT OFFICE.

WILLIAM ADAMS, OF HARTSELLE, ALABAMA.

PLANT-CHOPPING MACHINE.

1,389,570.   Specification of Letters Patent.   Patented Sept. 6, 1921.

Application filed October 12, 1920. Serial No. 416,370.

*To all whom it may concern:*

Be it known that I, WILLIAM ADAMS, a citizen of the United States, residing at Hartselle, in the county of Morgan and State of Alabama, have invented a new and useful Plant-Chopping Machine, of which the following is a specification.

My invention relates to a machine or plow for thinning out to a stand, plants that have been planted in a row by a drill. This machine is suggested for chopping or thinning out cotton, but can be used for any other kind of plants. This machine or plow is to be pulled by a horse or mule, and consists of a revolving disk that is driven by a drive wheel. The disk has notches cut in same that allows plants to remain standing while all plants between notches are plowed up, the disk being held at an angle over center of row while in operation. The drive wheel and disk plow are connected together in a plow frame similar to a cultivator frame complete with handles, guide plow, slides, etc. I attain these objects by a mechanism illustrated in the accompanying drawing in which—

Figure 1 is a plan view of the machine. Fig. 2 is a side elevation of the machine. Fig. 3 is a section through disk plow on sectional line 1—1 of Fig. 5. Fig. 4 is a side elevation of the sprocket wheel. Fig. 5 is a full elevation of the disk plow 12, taken in a plane at right angles to the axle of the plow. Fig. 6 is a rear elevation of the slides that regulate the depth of cut of the disk plow.

Similar numerals refer to similar parts throughout the several views.

The frame of the plow 7, is rigidly bolted together. The handles 18—18 are bolted to frame and to braces 9—9, the front of frames 7—7 are bolted to iron bars that are in turn bolted to a clevis 5 that has five holes for adjustment of swingletree.

The drive wheel 1 is rigidly fastened to an axle 21 which is also rigidly fastened to a sprocket wheel 3. The axle 21 is supported from frame by bearings 22 which are loose enough to allow axle to turn freely, and bearings are bolted securely to the frame like 14. The drive wheel 1 is to have a sharp wedge like edge that will better assist in holding plow to a line. This wheel may also have a corrugated edge if necessary to assist friction. Both sprocket wheels 3—3, are fastened rigidly to their respective axles—and are coupled together with a sprocket chain 8 so that when drive wheel 1 revolves, axle 16 will also revolve. The disk plow 12 is made of a steel disk as shown in Fig. 3, all edges of disk are sharp. The disk 12 is to be about 20 inches in diameter, and the circumference is cut by three equally spaced notches 13 into three equal arcs. The distance between notches 13 could be varied to suit the distance desired between plants. The disk 12 is rigidly fastened to axle 23 which is secured to frame bearings 14. Axles 23 and 16 are connected together by a universal joint 15. This universal joint enables the axle 16 to drive axle 24 which completes the mechanical drive from drive wheel 1 to disk 12, and as plow moves forward the disk revolves turning up the earth, and with it the plants except where notches leave plants standing.

The guide plow 17 is a small turning plow that is adjustable up and down, and is intended to guide the machine up next to the plants, and cultivate the right hand side of the plant row. The center of the plant row is on line II, see Fig. 1.

The slides 19—19, are adjustable up and down to regulate depth of plow, and the slides are to straddle the plant row and slide over the top of the ground helping operator to steady the machine and to keep plow the proper depth in the ground.

I am aware that prior to my invention that disk plows have been made, and that plant choppers have been made on various principles.

What I claim is:

1. A plant chopping machine comprising a frame, a revoluble notched disk carried thereby with its axis inclined to the line of draft and means for revolving the disk, whereby as the chopper is drawn along a row of plants the arcs of the disk will cut between the plants and the notches will prevent the disk from cutting the plants.

2. A plant chopper comprising a frame, a revoluble concave notched disk carried thereby with its axis inclined to the line of draft and a drive wheel and connections for revolving the disk whereby as the chopper is drawn along a row of plants the arcs of the disk will cut between the plants and the notches will prevent the disk from cutting the plants.

3. A plant chopper comprising a frame, a revoluble notched disk inclined to a horizontal plane, a drive wheel adapted to run on one side of the row of plants to be chopped and connected to the disk through a universal joint to turn the disk whereby as the chopper is drawn along a row of plants the arcs of the disk will cut between the plants and the notches will prevent the disk from cutting the plants.

4. A plant chopping machine comprising a frame, a revoluble disk carried thereby notched at regular intervals with its axis inclined to the line of draft, and means for revolving the disk in a direction to throw the dirt from the plants whereby as the chopper is drawn over a row of plants, the arcs of the disk will cut between the plants, throw the dirt to one side of the plants and the notches will prevent the disk from cutting the plants.

In testimony whereof I affix my signature.

WILLIAM ADAMS.